(12) United States Patent
Lundberg

(10) Patent No.: US 7,806,247 B2
(45) Date of Patent: Oct. 5, 2010

(54) COUPLING ELEMENT IN A MOTOR VEHICLE GEARBOX

(75) Inventor: Magnus Lundberg, Billdal (SE)

(73) Assignee: Volvo Lastvagnar AB, Göteborg (SE)

(*) Notice: Subject to any disclaimer, the term of this patent is extended or adjusted under 35 U.S.C. 154(b) by 1256 days.

(21) Appl. No.: 11/306,326

(22) Filed: Dec. 22, 2005

(65) Prior Publication Data

US 2009/0120755 A1 May 14, 2009

Related U.S. Application Data

(63) Continuation of application No. PCT/SE2004/000588, filed on Apr. 15, 2004, now abandoned.

(30) Foreign Application Priority Data

Jun. 24, 2003 (SE) .................................. 0301839

(51) Int. Cl.
*F16D 11/14* (2006.01)
(52) U.S. Cl. .................. 192/114 T; 192/69.9; 192/108
(58) Field of Classification Search ................ 192/69.9, 192/108, 114 T
See application file for complete search history.

(56) References Cited

U.S. PATENT DOCUMENTS

| 1,935,965 | A | * | 11/1933 | Wahlberg | 192/69.9 |
| 3,043,414 | A | * | 7/1962 | Peras | 192/114 T |
| 3,249,188 | A | * | 5/1966 | Maina | 192/69.9 |
| 3,537,558 | A | * | 11/1970 | Bibbens | 192/114 T |
| 4,727,968 | A | * | 3/1988 | Chana | 192/53.34 |
| 4,848,548 | A | | 7/1989 | Diehl | |
| 5,960,925 | A | * | 10/1999 | Helms et al. | 192/108 |
| 6,296,100 | B1 | | 10/2001 | Schetter et al. | |

* cited by examiner

*Primary Examiner*—Richard M. Lorence
(74) *Attorney, Agent, or Firm*—Novak Druce + Quigg LLP

(57) ABSTRACT

A coupling element, for example a coupling sleeve (1), having coupling teeth (2) which, over a part (2a) of their length, have a gradually diminishing cross-sectional profile, a so-called back rake. Over the part, the coupling teeth have a portion (7b) nearest the tooth root having a first pressure angle, which portion connects to a portion (7b) extending to the tooth tip and having a greater pressure angle than the former portion.

7 Claims, 2 Drawing Sheets

COUPLING ELEMENT IN A MOTOR VEHICLE GEARBOX

CROSS-REFERENCE TO RELATED APPLICATIONS

The present application is a continuation patent application of International Application No. PCT/SE2004/000588 filed 15 Apr. 2004 which is published in English pursuant to Article 21 (2) of the Patent Cooperation Treaty and which claims priority to Swedish Application No. 0301839-7 filed 24 Jun. 2003. Said applications are expressly incorporated herein by reference in their entireties.

TECHNICAL FIELD OF THE INVENTION

The present invention relates to a coupling element in a motor vehicle gearbox, which coupling element has coupling teeth that are distributed circumferentially and that extend longitudinally at least substantially in the axial direction of the gearbox. The coupling teeth are arranged, upon engagement with coupling teeth on an interacting coupling element, to lock an element mounted rotatably in the gearbox, for example a gearwheel or a shaft. Over at least a part of their longitudinal extent, the coupling teeth taper such that the cross-sectional profile of the teeth, taken in a cutting plane that is perpendicular to the longitudinal axis of the tooth, gradually shrinks or diminishes along the length of the tapering portion of the tooth. This would be most apparent by viewing the tip of the tooth (e.g., a radially endmost surface of the tooth) and looking in a radial direction.

The invention also relates to a method of manufacturing a coupling element having coupling teeth as described above. In a first stage of the manufacturing method, machining of the coupling element takes place so that coupling teeth, so-called original teeth, having constant (i.e., non-shrinking or non-diminishing) cross-sectional profile along their length are formed. In a second stage, machining of the original coupling teeth takes place so that these original teeth, at least over a part of their length, are given a cross-sectional profile of which a part gradually diminishes so as to provide back rake tapering along the length of the tooth in the tapering portion of the tooth.

BACKGROUND OF INVENTION

It is common practice in gearboxes to configure the coupling sleeves and the coupling rings of the disengagable gearwheels with coupling teeth which are tapered so that mutually contacting longitudinal ends of the teeth on the coupling sleeves and the coupling rings are V-shaped, i.e., the teeth are wider at their ends than they are at a distance from said ends. It is customary to say that the flanks of such coupling teeth are configured with a "back rake". The rotational force upon mutually contacting surfaces with back rake will consequently produce a resultant force which acts in the direction of engagement of the coupling sleeve in order to prevent an engaged gear from being unintentionally disengaged.

In the manufacture of the aforementioned coupling elements, efforts have previously been made to configure the back-raking toothed portion with flanks having the same pressure angle as the original tooth flank. In this way, the least possible material quantity is pressed aside or removed from the original flank.

Following manufacture of a coupling element having constant cross-sectional profile of the coupling teeth, various machining methods have been utilized in order thereafter to form toothed portions having back-raking flanks. The two most common methods are press-rolling and machine-cutting. Both have advantages and disadvantages.

In press-rolling, the material is pressed aside from the portion with back rake. This method has the advantage that the tooth can be configured with back rake right down to the tooth root without the need for undercutting, which otherwise weakens the tooth. The disadvantage is that the wear on the tool is very high, resulting in relatively short service life, so that the tool costs become relatively high. Pressed-aside material is left behind as a bead, which can also be disadvantageous.

In the other method, material is removed by machine-cutting using a cutting tool to which motion along a cycloid curve is imparted. The advantage is longer service life of the tool but, in return, it is not possible to form, for example, internal teeth on a coupling sleeve with back rake right down to the tooth root without any undercutting in the root of the profile of the original tooth or, in the absence of undercutting, without a sharp shelf being formed in the tooth at a distance from the bottom of the tooth space of the original tooth. In both cases, this can mean that the strength is reduced in the coupling teeth with back rake. Undercutting can mean, moreover, that the strength is reduced in the profile of the original tooth, which can be a major disadvantage should the continuation thereof, substantially axially in connection with the back-raking coupling teeth, be used, for example, in a splined joint or as a rolling tooth against an opposing gearwheel.

SUMMARY OF INVENTION

The purpose of the present invention is to produce a coupling element of the type introduced above and which is configured such that its back-raking tooth portions can be manufactured by machine-cutting almost right down to or even down into the tooth root of the profile of the original tooth without the need for undercutting thereof and without the formation of a sharp shelf.

This is achieved according to the teachings of the invention by the opposite flanks of the coupling teeth over the portion that is to have back rake having a first portion nearest the tooth root having a first pressure angle, which first portion connects to a second part extending to the tooth tip and having both a greater pressure angle than the first portion and back rake-providing taper.

In the method of manufacturing the coupling element which has been described in the introduction, this is quite simply achieved by the teeth, in the second stage, being machined so that the pressure angle of the machined flank surfaces is greater than the pressure angle following the machining in the first stage.

In the machining, the tool is directed so that a portion of the flank (e.g., closest to the tip) has back rake (i.e., tapers) and bevels into the shape of the original tooth in the lower part of its flank or even some of the way down into its tooth root; i.e., the tool is directed so that the portions of the flank surfaces with back rake form a transition at an obtuse angle to the original, non-back-raked flank surfaces. This avoids machining along a profile between back rake and the profile of the original tooth, which creates a shelf; i.e., a sharp transition between the back-raked and the original, non-back-raked flank surfaces.

BRIEF DESCRIPTION OF THE DRAWINGS

The invention is described in greater detail with reference to the illustrative embodiments shown in the accompanying drawings, in which.

DETAILED DESCRIPTION

Figure 1:
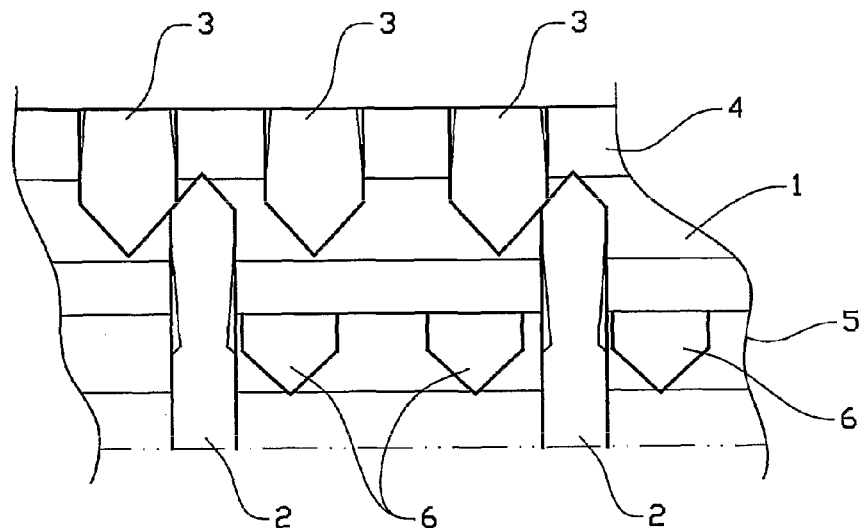
FIG. 1 shows a diagrammatic plan projection of a part of a coupling sleeve, synchronizing ring and coupling ring in a motor vehicle gearbox.

In FIG. 1, a coupling sleeve 1 is shown that is intended for non-rotatable, yet axially displaceable, mounting on a hub of a shaft mounted rotatably in a gearbox (not shown).

The coupling sleeve 1 is configured with coupling teeth 2 intended to be brought into engagement with coupling teeth 3 on a coupling ring 4 intended to be connected non rotatably to a gearwheel (not shown) mounted rotatably on the shaft. A synchronizing ring with locking teeth 6, disposed between the coupling sleeve 1 and the coupling ring 4, is denoted by 5.

Figure 2:
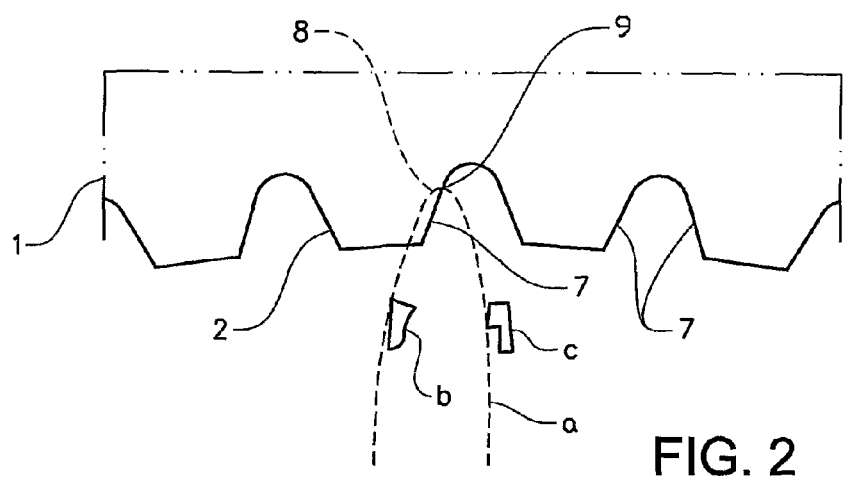
FIG. 2 shows a diagrammatic side view of a part of a coupling sleeve and the motional path of a cutting tool in a known machining process.

FIG. 2 shows a part of a coupling sleeve 1 having teeth 2 formed in an initial machining so that the flanks 7 on opposite sides of the teeth extend parallel to each other; i.e., the thickness of the teeth 2 does not vary along the length of the teeth so they do not taper in the longitudinal direction. In the figure, the dashed line "a" illustrates the motional path of two different cutting tools "b" and "c" respectively in subsequent machining of the teeth 2 according to a previously known method for forming the portion with back rake (i.e., the portion that tapers longitudinally). The motion along the shown path "a" can be produced with a tool which replaces a tooth on a gearwheel rolling against the teeth 2 of the coupling sleeve.

With the tool "b", the cutting of the material is commenced at the tooth tip and concluded directly above the tooth root. With the tool "c", the cutting takes place in the reverse direction. Common to both tools, however, is that they move along a path "a" which, within the cutting region of the tools, lies substantially parallel with the original tooth flank 7 with respect to or in terms of the radial or radial/circumferential orientation of the plane of the flank surface. The result is that a "shelf" 8 having a sharp edge 9 is formed directly above the tooth root. In order to escape the formation of such a shelf, the teeth can be configured with an undercut, but the tooth root is then weakened, in return.

Figure 3:
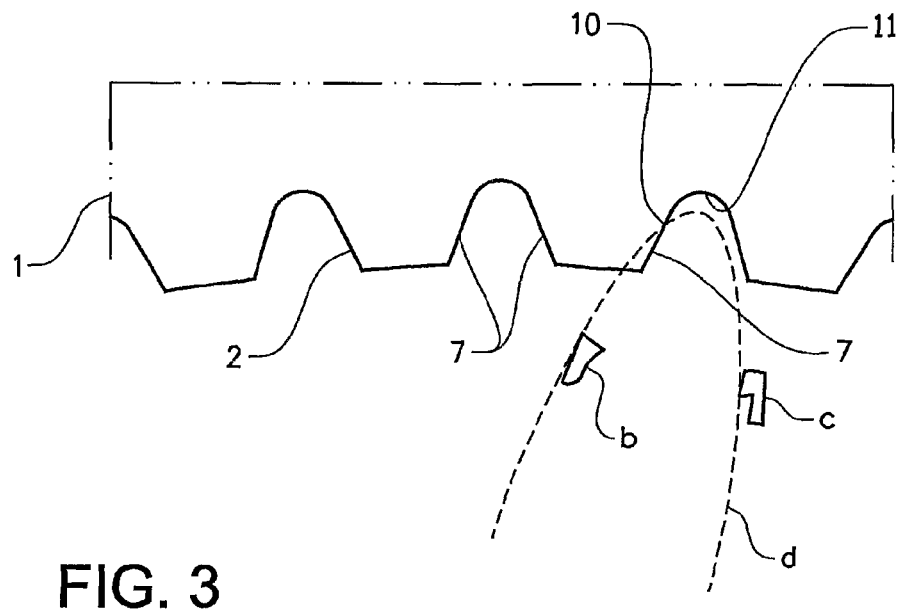
FIG. 3 shows a view corresponding to FIG. 2, but with the motional path of the tool in the machining process according to the present invention.

As in FIG. 2, FIG. 3 shows a part of a coupling sleeve 1 having teeth 2 formed in an initial machining so that the flanks 7 on opposite sides of the teeth extend parallel to each other; i.e., the thickness of the teeth does not vary along the length of the teeth so they do not taper longitudinally.

Subsequently, in contrast to the back rake-forming step illustrated in FIG. 2, the tools "b" and "c" for machining the portion with back rake are directed along a path "d" which, within the cutting region of the tool, is not parallel with the original tooth flank 8 with respect to or in terms of the radial or radial/circumferential orientation of the plane of the flank surface. The coupling teeth 2 thereby acquire one flank portion 7a that has back rake (to give the tooth a portion that tapers longitudinally) and that has a greater a pressure angle than the remaining flank portion 7b, which has the pressure angle of the original tooth and which does not taper longitudinally (see FIG. 4).

By choosing a larger pressure angle for the flank portion 7a, the formation of a shelf 8 is avoided. Instead, a transition 10 with an obtuse angle, preferably selected to be greater than 150 degrees, is formed between the flank portions 7a and 7b when the tool is directed along a path "d" whose turning point lies in a tooth space 11, in the shown illustrative embodiment approximately in the middle of a tooth space 11, and not, as in the previously known case shown in FIG. 2, within the cutting region of the tooth.

Figure 4:
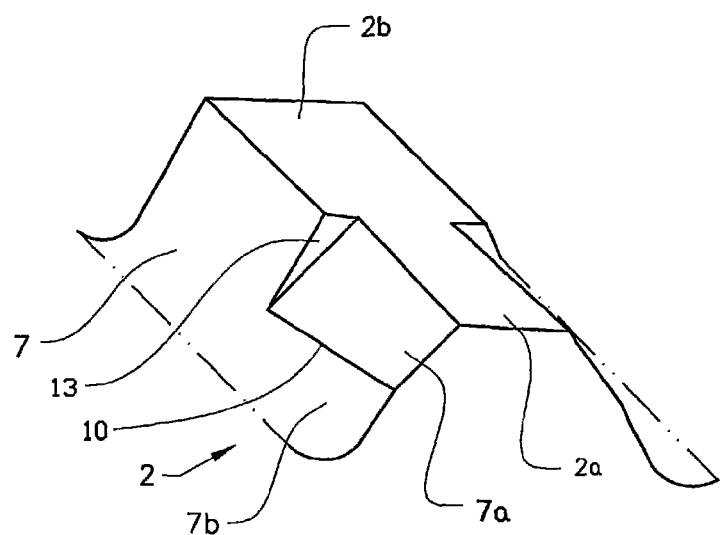
FIG. 4 shows a diagrammatic perspective view, from above and looking down and to the left toward the tip surface (2a, 2b), of a coupling tooth of a coupling element according to the invention.

In FIG. 4, a coupling tooth is shown having a front portion 2a with back rake (provided by the flank surfaces 7a) and a rear portion 2b with no back rake. The difference in the pressure angle between the flank portions 7a and 7b (which does not have back rake) is here clearly visible at the transition surface 13 between the front portion 2a and the rear portion 2b.

The invention has been described above with reference to a coupling sleeve 1 having internal teeth 2, but opposite-running coupling elements with external cogs, for example the coupling rings, must, of course, be given a tooth form matched to the tooth form of the coupling sleeve.

Within the scope of the invention, the coupling element can constitute part of a gearwheel having involute teeth, which engage with teeth on an opposite-running gearwheel, in which case the coupling teeth with back rake are configured in one piece with and form an extension of the involute teeth of the gearwheel. Such a gearwheel with integrated coupling sleeve might, for example, be the ring gear in a planetary gearing in a range-change gearbox, in which the ring gear is axially displaceable and in which its coupling teeth are brought into engagement with a coupling ring, fixedly connected to the gearbox casing, for locking of the ring gear.

What is claimed is:

1. A coupling element for use in a motor vehicle gearbox, which coupling element has coupling teeth that are distributed circumferentially and that extend longitudinally in a direction corresponding at least substantially to the axial direction of the gearbox, the coupling teeth being configured and arranged such that, upon engagement with coupling teeth on an interacting coupling element, they rotationally lock an element that is otherwise rotatable within the gearbox, wherein a tip portion of each of said coupling teeth tapers longitudinally over at least a part of the longitudinal extent of the tooth such that the cross-sectional area of the tooth, taken in a cutting plane that is perpendicular to the longitudinal axis of the tooth, gradually shrinks or diminishes, and wherein, over said at least a part of the longitudinal extent of the tooth, the opposite flanks of each of the coupling teeth have 1) non-tapering first portions nearest the tooth root having a first pressure angle and extending parallel to the longitudinal axis of the tooth, and 2) longitudinally tapering second portions extending from said non-tapering first portions to the tooth tip and having a greater pressure angle than the first portions, the longitudinally tapering second portions being angled relative to the longitudinal axis of the tooth such that said tip portion tapers longitudinally over said at least a part of the longitudinal extent of the tooth.

2. The coupling element as recited in claim 1, wherein said second portions connect to the first portions via obtuse-angled transitions.

3. The coupling element as recited in claim 2, wherein the transition angles are greater than 150 degrees.

4. The coupling element as recited in claim 1, wherein said coupling element is a coupling sleeve that is configured to be mounted in an axially displaceable but non-rotatable manner on a hub and that has internally distributed coupling teeth.

5. The coupling element as recited in claim 4, wherein said coupling teeth have gradually shrinking or diminishing cross-sectional areas over only a part of their axial extent.

6. The coupling element as recited in claim 1, wherein said coupling element is a coupling ring that is configured to be connected non-rotatably to a rotatably mounted gearwheel and that has external, evenly distributed coupling teeth.

7. The coupling element as recited in claim 6, wherein said coupling teeth have shrinking or diminishing cross-sectional areas over the entirety of their axial extent.

* * * * *